(12) United States Patent
Takeuchi et al.

(10) Patent No.: US 10,161,447 B2
(45) Date of Patent: Dec. 25, 2018

(54) BEARING STRUCTURE AND AIR BLOWER

(71) Applicant: MINEBEA CO., LTD., Kitasaku-gun, Nagano (JP)

(72) Inventors: Nobuo Takeuchi, Nagano (JP); Masayuki Iijima, Nagano (JP); Tatsuya Ide, Nagano (JP)

(73) Assignee: Minebea Co., Ltd., Nagano (JP)

( * ) Notice: Subject to any disclaimer, the term of this patent is extended or adjusted under 35 U.S.C. 154(b) by 174 days.

(21) Appl. No.: 15/058,382

(22) Filed: Mar. 2, 2016

(65) Prior Publication Data

US 2016/0258485 A1 Sep. 8, 2016

(30) Foreign Application Priority Data

Mar. 6, 2015 (JP) .................. 2015-044725

(51) Int. Cl.
*F16C 33/10* (2006.01)
*F16C 17/02* (2006.01)
(Continued)

(52) U.S. Cl.
CPC .......... *F16C 33/104* (2013.01); *F04D 25/062* (2013.01); *F04D 29/053* (2013.01);
(Continued)

(58) Field of Classification Search
CPC ........ F16C 17/02; F16C 17/026; F16C 17/10; F16C 17/107; F16C 33/104; F16C 33/1065; F16C 33/74; F16C 33/745; F16C 2360/46
See application file for complete search history.

(56) References Cited

U.S. PATENT DOCUMENTS 5,895,119 A 4/1999 Miyasaka et al.
5,941,646 A * 8/1999 Mori .................. F16C 17/026
384/100
(Continued)

FOREIGN PATENT DOCUMENTS

CN 102356249 A 2/2012
JP H02-065714 U 5/1990
(Continued)

OTHER PUBLICATIONS

Office Action dated Feb. 1, 2017 in the corresponding Japanese Patent Application 2015-044725.
(Continued)

*Primary Examiner* — James Pilkington
(74) *Attorney, Agent, or Firm* — Carrier Blackman & Associates, P.C.; Joseph P. Carrier; Jeffrey T. Gedeon

(57) ABSTRACT

A bearing structure includes: a shaft; an oil-impregnated bearing that supports the shaft to be rotatable and includes a first sintered metal material having a first density; a bearing holder that supports an outer circumferential surface of the oil-impregnated bearing; and a seal member that is provided at an opening of the bearing holder, wherein the shaft is provided with an annular groove having a side surface portion that has an outer diameter that decreases as the side surface portion separates away from one end surface of the oil-impregnated bearing, and wherein the seal member includes a second sintered metal material having a second density that is lower than the first density of the first sintered metal material.

5 Claims, 7 Drawing Sheets

(51) Int. Cl.
*F04D 29/10* (2006.01)
*F04D 29/063* (2006.01)
*F04D 29/057* (2006.01)
*F04D 29/053* (2006.01)
*F04D 25/06* (2006.01)
*F16C 33/74* (2006.01)
*F16C 17/08* (2006.01)

(52) U.S. Cl.
CPC ......... *F04D 29/057* (2013.01); *F04D 29/063* (2013.01); *F04D 29/102* (2013.01); *F16C 17/02* (2013.01); *F16C 33/106* (2013.01); *F16C 33/74* (2013.01); *F16C 17/08* (2013.01); *F16C 2202/10* (2013.01); *F16C 2360/46* (2013.01)

(56) References Cited

U.S. PATENT DOCUMENTS

| | | | |
|---|---|---|---|
| 6,023,114 A * | 2/2000 | Mori | F16C 33/104 |
| | | | 310/44 |
| 6,082,903 A | 7/2000 | Saneshige | |
| 6,119,346 A | 9/2000 | Miyasaka et al. | |
| 8,992,658 B2 | 3/2015 | Ito et al. | |
| 2002/0051588 A1 | 5/2002 | Koseki et al. | |
| 2005/0220378 A1 | 10/2005 | Kaneko et al. | |
| 2007/0071374 A1 * | 3/2007 | Hong | F16C 17/10 |
| | | | 384/100 |
| 2007/0076992 A1 * | 4/2007 | Hong | F16C 17/107 |
| | | | 384/119 |
| 2009/0072643 A1 | 3/2009 | Yazawa et al. | |
| 2010/0123361 A1 | 5/2010 | Jang | |
| 2013/0119801 A1 * | 5/2013 | Smirnov | F16C 33/763 |
| | | | 310/90 |

FOREIGN PATENT DOCUMENTS

| | | |
|---|---|---|
| JP | H09-151941 A | 6/1997 |
| JP | H10-164794 A | 6/1998 |
| JP | H11-195267 A | 7/1999 |
| JP | H11-218131 A | 8/1999 |
| JP | 2000-352414 A | 12/2000 |
| JP | 2001-271828 A | 10/2001 |
| JP | 2002-139041 A | 5/2002 |
| JP | 2003-088034 A | 3/2003 |
| JP | 2003-148498 A | 5/2003 |
| JP | 2004-190791 A | 7/2004 |
| JP | 2004-263821 A | 9/2004 |
| JP | 2005-147266 A | 6/2005 |
| JP | 2007-100958 A | 4/2007 |
| JP | 2009-063094 A | 3/2009 |
| JP | 4596613 B2 | 12/2010 |

OTHER PUBLICATIONS

Office Action dated Nov. 27, 2017, in the corresponding Chinese Patent Application 201610115719.9 with the English translation thereof.

* cited by examiner

BEARING STRUCTURE AND AIR BLOWER

BACKGROUND OF THE INVENTION

1. Field of the Invention

The present invention relates to a bearing structure including an oil-impregnated bearing including a porous sintered metal material and an air blower having the bearing structure.

2. Description of the Related Art

For example, JP-B-4596613 discloses a technique of collecting and returning a lubricant leaking from an oil-impregnated bearing in a bearing structure including the oil-impregnated bearing made of a porous sintered metal material. In the bearing structure described in Japanese Patent No. 4596613, since an opening of a sleeve holder (bearing holder) is not sealed, foreign substance may go into the sleeve holder from the opening, particularly, between the oil-impregnated bearing and a shaft body. In a bearing unit (bearing structure) described in JP-A-2009-063094, leakage of a lubricant is prevented by sealing an opening edge of a housing (bearing holder) with a seal member. However, since a porous elastic material (such as felt or sponge) received in the seal member is brought into close contact with an end face of a radial bearing (oil-impregnated bearing), that is, since two members of a member for sealing and a member for holding a lubricant are required, there is a problem in that the number of components (members) increases.

JP-A-2001-271828 discloses a dynamic pressure type sintered oil-impregnated bearing unit (bearing structure) in which an opening of a housing (bearing holder) is sealed with a seal member including a single sintered metal material. For example, when the seal member made of the sintered metal which is used in the bearing unit described in JP-A-2001-271828 is applied to the bearing unit described in JP-A-2009-063094, an increase in the number of components can be prevented, but, similarly to the bearing structure described in JP-B-4596613, foreign substance may come in from a clearance provided between a side wall of the radial bearing (bearing holder) and an outer surface of a shaft in the bearing unit described in JP-A-2009-063094.

SUMMARY OF THE INVENTION

One of objects of the present invention is to provide a bearing structure capable of holding a lubricant for a long period of time and to achieve an extension of life of an air blower.

According to an illustrative embodiment of the present invention, there is provided a bearing structure including: a shaft; an oil-impregnated bearing that supports the shaft to be rotatable and includes a first sintered metal material having a first density; a bearing holder that supports an outer circumferential surface of the oil-impregnated bearing; and a seal member that is provided at an opening of the bearing holder. The shaft is provided with an annular groove having a side surface portion that has an outer diameter that decreases as the side surface portion separates away from one end surface of the oil-impregnated bearing. The seal member includes a second sintered metal material having a second density that is lower than the first density of the first sintered metal material. The seal member includes a contact surface that contacts with the one end surface of the oil-impregnated bearing, a large-diameter inner circumferential surface arranged to face the annular groove of the shaft, and a small-diameter inner circumferential surface that provides a seal clearance along the outer circumferential surface of the shaft.

According to another illustrative embodiment of the present invention, there is provided an air blower including: a rotor; a stator; a case that accommodates the rotor and the stator; and a bearing structure that is provided between the rotor and the stator, the bearing structure including: a shaft; an oil-impregnated bearing that supports the shaft to be rotatable and includes a first sintered metal material having a first density; a bearing holder that supports an outer circumferential surface of the oil-impregnated bearing; and a seal member that is provided at an opening of the bearing holder. The shaft is provided with an annular groove having a side surface portion that has an outer diameter that decreases as the side surface portion separates away from one end surface of the oil-impregnated bearing. The seal member includes a second sintered metal material having a second density that is lower than the first density of the first sintered metal material. The seal member includes a contact surface that contacts with the one end surface of the oil-impregnated bearing, a large-diameter inner circumferential surface arranged to face the annular groove of the shaft, and a small-diameter inner circumferential surface that provides a seal clearance along the outer circumferential surface of the shaft.

DETAILED DESCRIPTION

Figure 1:
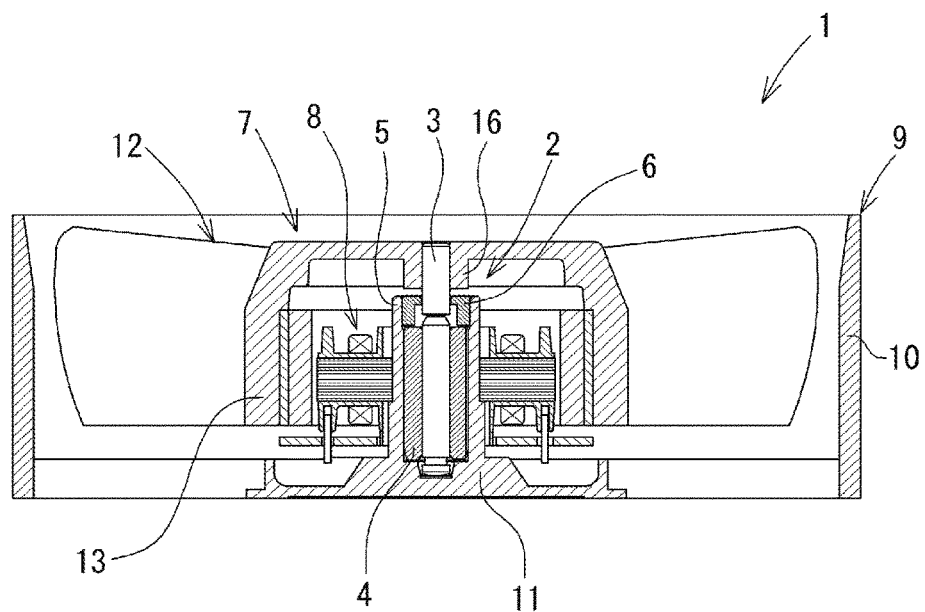
FIG. 1 is a cross-sectional view taken along an axial plane of an air blower according to an embodiment of the present invention.

An embodiment of the present invention will be described below with reference to the accompanying drawings. In the following description, for the purpose of convenience, the vertical direction in FIG. 1 is defined as a vertical direction. However, this is not intended to limit the direction of an air blower 1.

FIG. 1 is a cross-sectional view taken along an axial plane of an air blower 1 according to the embodiment of the present invention. As illustrated in FIG. 1, the air blower 1 has a bearing structure 2 including a shaft 3, an oil-impregnated bearing 4 that rotatably supports the shaft 3, a bearing holder 5 that holds the oil-impregnated bearing 4, and a seal member 6 that is provided at an opening 51 (see FIG. 3) of the bearing holder 5. The air blower 1 has a basic structure of a so-called DC brushless motor and includes a rotor 7, a stator 8, and a case 9 that accommodates the rotor 7 and the stator 8 therein.

The case 9 is made of a thermoplastic resin material such as polybutylene terephtalate (PBT) and includes an outer frame 10, a base 11 disposed at the center of the outer frame 10, and spokes (not illustrated) provided between the outer frame 10 and the base 11. The bearing holder 5 which is an element of the bearing structure 2 is provided monolithically with the base 11. The bearing holder 5 is provided in a cylindrical shape with an opened top and is integrally formed with the base 11. In other words, the bearing holder 5 is molded at the same time as the case 9. The bearing holder 5 may be made of a material different from the case 9 and may be integrally molded (insert-molded) with the case 9.

Figure 2:
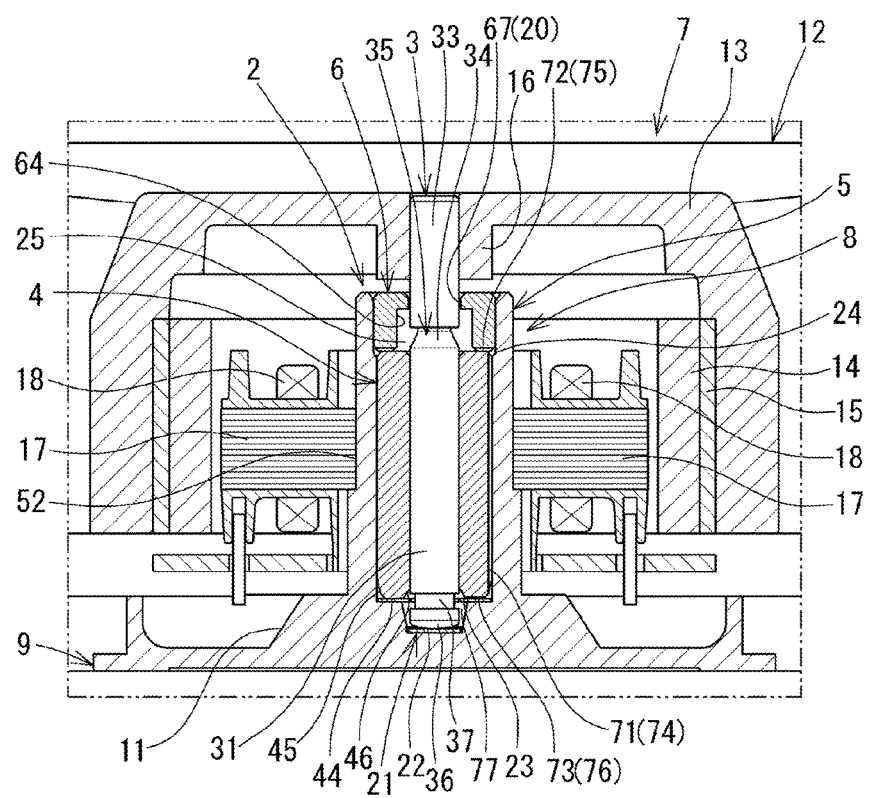
FIG. 2 is an enlarged view of a bearing structure shown in FIG. 1.

As illustrated in FIGS. 1 and 2, the rotor 7 includes a fan 12, a permanent magnet 14 that is disposed in an annular shape inside a base portion 13 of the fan 12, and a yoke 15 that is disposed between the base portion 13 and the permanent magnet 14. In the fan 12, a boss 16 provided at the center of the base portion 13 is fixed to a second shaft portion 33 of the shaft 3 to be described later. In the permanent magnet 14, an S pole and an N pole are alternately magnetized in the circumferential direction. The permanent magnet 14 is bonded to the inner circumferential surface of the yoke 15, for example, using an adhesive.

The stator 8 includes a stator core 17 that is attached to an outer circumferential surface 52 of the bearing holder 5 and plural coils 18 which are wound around the stator core 17. The plural coils 18 are disposed in the circumferential direction of the bearing holder 5 so as to face the permanent magnet 14. A drive current is supplied to the coils 18 via a power supply wire. By causing a drive circuit (not illustrated) to control the polarity of the drive current and switching magnetic attraction/repulsion between the permanent magnet 14 and the coils 18, a force for rotating the rotor 7 in one direction relative to the stator 8 is generated.

The shaft 3 includes a portion located inside the oil-impregnated bearing 4, that is, a first shaft portion 31 of which an outer circumferential surface 32 is supported by an inner circumferential surface 41 of the oil-impregnated bearing 4, the above-mentioned second shaft portion 33, having the same outer diameter as the first shaft portion 31 and disposed coaxially to the first shaft portion 31, to which the boss 16 of the fan 12 is fixed, and an oil thrower groove 35 (annular groove) that is disposed between the first shaft portion 31 and the second shaft portion 33.

Figure 3:
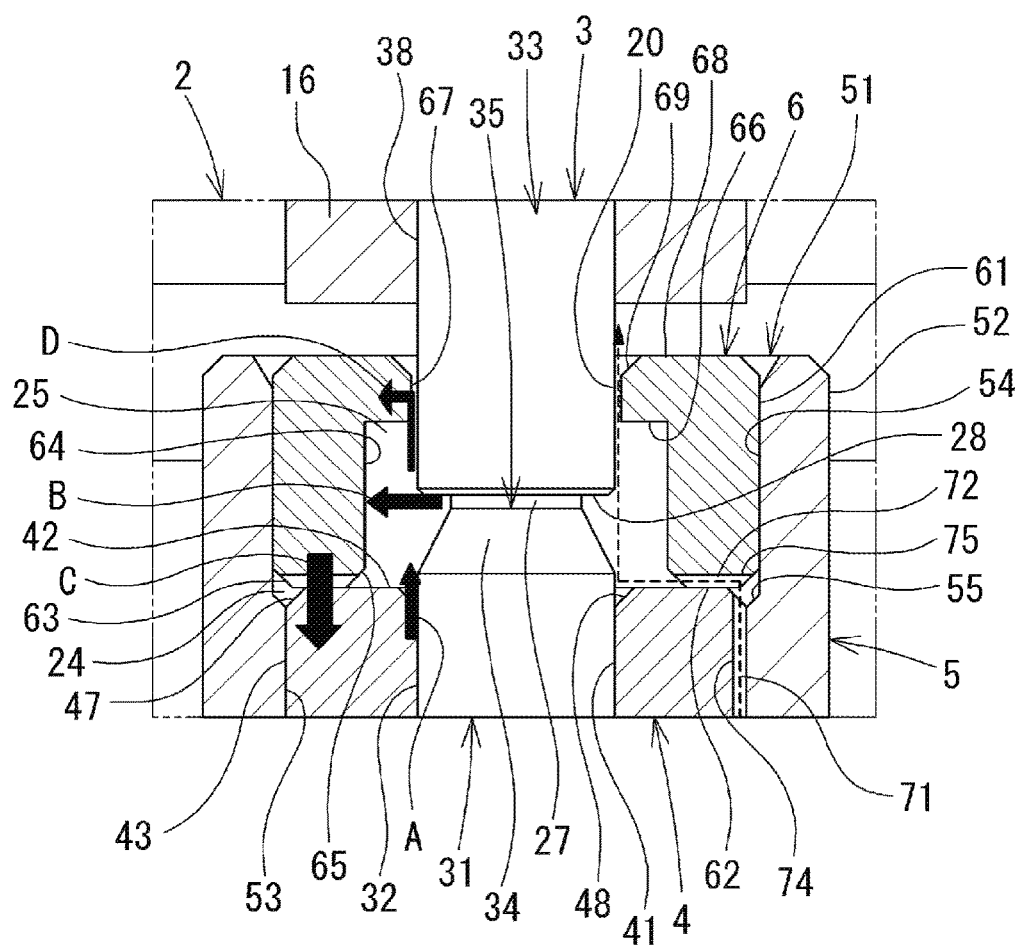
FIG. 3 is an enlarged view of a part shown in FIG. 2.

As illustrated in FIG. 3, the oil thrower groove 35 is disposed above (outside) a top end surface 42 (one end surface) of the oil-impregnated bearing 4 and includes a side surface portion 34 of which the outer diameter decreases as the side surface portion is separated away upward (upward in FIG. 3) from the top end surface 42 of the oil-impregnated bearing 4, an annular portion 27 that is connected to the side surface portion 34 and that has a constant width (length in the vertical direction), and an annular surface 28 that is provided between the annular portion 27 and the second shaft portion 33 (the outer circumferential surface 38). In the embodiment, the side surface portion 34 is provided in a taper shape which is gradually narrowed upward from the axial position of the top end surface 42 of the oil-impregnated bearing 4. In more detail, the taper start position of the side surface portion 34 may be set to a position which is slightly (for example, by a groove depth of a V-shaped groove 75 to be described later) higher or lower than the axial position of the top end surface 42 of the oil-impregnated bearing 4. An inclination angle of the side surface portion 34 about the axis of the shaft 3 can be appropriately set. The annular portion 27 may have a sectional shape like a straight line shape, or other shape such as an arc shape.

As illustrated in FIG. 2, a tip portion 36 that is supported by a thrust bearing is provided at the bottom end of the shaft 3, that is, the bottom end of the first shaft portion 31. The thrust bearing 21 includes a recessed portion that is provided in the base 11 of the case 9, that is, on the bottom of the bearing holder 5, and is configured to rotatably support the tip portion 36 of the shaft 3 by a thrust plate 22 received in the recessed portion.

The oil-impregnated bearing 4 is made of a first sintered metal material which is a porous sintered metal (porous metal) material. The oil-impregnated bearing 4 has a cylindrical shape, and the outer circumferential surface 43 is supported by the inner circumferential surface 53 of the bearing holder 5. The oil-impregnated bearing 4 is positioned in the axial direction (the vertical direction) relative to the bearing holder 5 by bringing an annular bottom end surface 44 into contact with the base 11 (the recessed portion) of the case 9 with a washer 23 interposed therebetween. The washer 23 prevents the shaft 3 from falling out from the oil-impregnated bearing 4 by fitting the inner circumferential portion thereof into a small-diameter portion 37 provided between the first shaft portion 31 and the tip portion 36 of the shaft 3 and interposing the outer circumferential portion thereof between the oil-impregnated bearing 4 and the base 11 of the case 9. A chamfered portion 45 and a chamfered portion 46 are provided at the outer circumferential edge and the inner circumferential edge of the bottom end of the oil-impregnated bearing 4.

Figure 4:
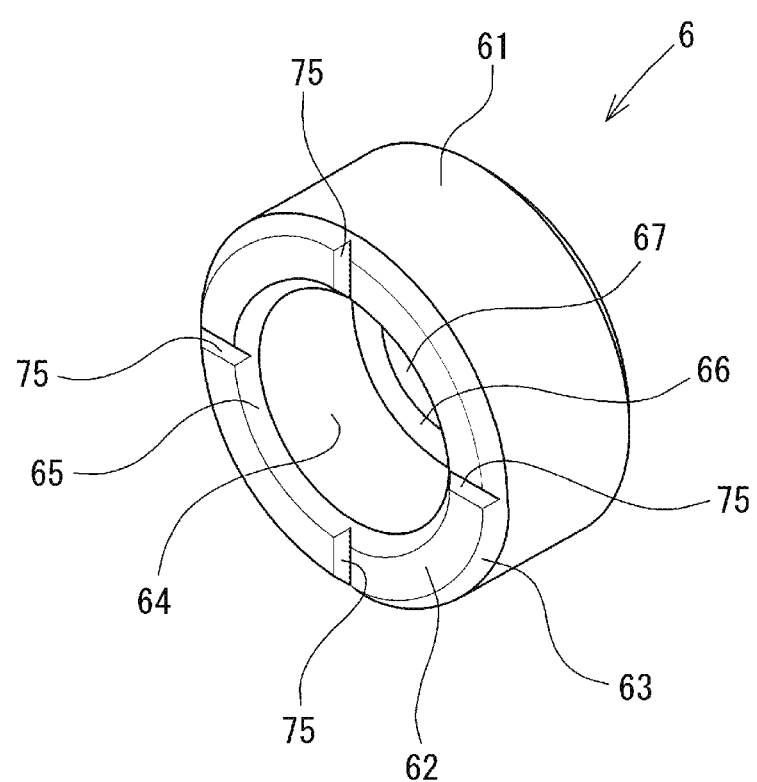
FIG. 4 is a perspective view of a seal member alone.

The seal member 6 is made of a second sintered metal material which is a porous sintered metal material having a density lower than the density of the first sintered metal material of the oil-impregnated bearing 4. As shown in FIGS. 3 and 4, the seal member 6 has an annular shape and is pressed into the opening 51 of the bearing holder 5. In other words, an outer circumferential surface 61 of the seal member 6 is supported by an annular seal surface 54 provided at the opening 51 of the bearing holder 5. The seal surface 54 is configured by enlarging the diameter of the inner circumferential surface 53 of the bearing holder 5. The bearing holder 5 includes an annular chamfered portion 55 provided between the inner circumferential surface 53 and the seal surface 54.

The seal member 6 includes an annular contact surface 62 that contacts with the top end surface 42 (one end surface) of the oil-impregnated bearing 4. The contact surface 62 contacts with the outer circumferential portion (a portion within a predetermined range around the outer circumference) of the top end surface 42 of the oil-impregnated bearing 4. In other words, the inner diameter of the contact surface 62 is set to be larger than the inner diameter of the oil-impregnated bearing 4 and smaller than the outer diameter of the oil-impregnated bearing 4. The seal member 6 includes a chamfered portion 63 provided along the edge between the outer circumferential surface 61 and the contact surface 62. Accordingly, an air passage 24 that extends in an annular shape about an axis and that has a polygonal cross-section taken along the axial plane is provided among the chamfered portion 47 provided along the edge between the inner circumferential surface 41 and the top end surface 42 of the oil-impregnated bearing 4, the chamfered portion 55 of the bearing holder 5, and the chamfered portion 63 of the seal member 6.

As illustrated in FIG. 3, the seal member 6 includes a large-diameter inner circumferential surface 64 that is connected to the contact surface 62 with the chamfered portion 65 interposed therebetween. The large-diameter inner circumferential surface 64 is provided such that a middle position in the height direction (axial direction) faces the annular portion 27 of the oil thrower groove 35 of the shaft 3. In other words, the large-diameter inner circumferential surface 64 faces the oil thrower groove 35 and the outer circumferential surface 38 of the bottom end of the second shaft portion 33. The diameter of the large-diameter inner circumferential surface 64 is set to larger than the inner diameter of the oil-impregnated bearing 4, that is, the outer diameter (the outer diameter of the first shaft portion 31 and the outer diameter of the second shaft portion 33) of the shaft 3, and smaller than the outer diameter of the oil-impregnated bearing 4.

The seal member 6 includes a small-diameter inner circumferential surface 67 that is provided at the top end of the large-diameter inner circumferential surface 64 with an annular surface 66 (stepped portion) interposed therebetween. The small-diameter inner circumferential surface 67 is provided between the annular surface 66 and an annular top end surface 68 of the seal member 6. The small-diameter inner circumferential surface 67 faces the outer circumferential surface 38 of a portion protruding from the fan 12 (boss 16) in the second shaft portion 33. The annular surface 66 faces the inner circumferential portion (a portion within a predetermined range around the inner circumference) of the top end surface 42 of the oil-impregnated bearing 4. Accordingly, as illustrated in FIG. 3, an annular space 25 is provided inside the seal member 6, the annular space 25 being surrounded with the large-diameter inner circumferential surface 64, the annular surface 66, the oil-impregnated bearing 4, and the shaft 3 (the second shaft portion 33 and the oil thrower groove 35).

According to an embodiment of the bearing structure of the present invention, a seal clearance 20 (labyrinth clearance) is provided between the small-diameter inner circumferential surface 67 of the seal member 6 and the outer circumferential surface 38 of the second shaft portion 33 (the outer circumferential surface of the shaft 3). In other words, the seal clearance 20 is provided between the space 25 inside the seal member 6 and the space outside the seal member 6 (the inner space of the case 9) and causes both spaces to communicate with each other. The seal member 6 includes a chamfered portion 69 that is provided between the small-diameter inner circumferential surface 67 and the top end surface 68. A constant clearance is provided in the height direction (the axial direction) between the top end surface 68 of the seal member 6 and the boss 16 of the fan 12.

Referring to FIGS. 2 and 3, a V-shaped groove 74 extending along the axis in the vertical direction from the top end surface 42 (one end surface) of the oil-impregnated bearing 4 to the bottom end surface 44 (the other end surface) is provided on the outer circumferential surface 43 of the oil-impregnated bearing 4. Accordingly, in the bearing structure 2, an air passage 71 (the first air passage) extending from the top end surface 42 of the oil-impregnated bearing 4 to the bottom end surface 44 is provided between the oil-impregnated bearing 4 and the bearing holder 5. A V-shaped groove 75 extending from the large-diameter inner circumferential surface 64 of the seal member 6 to the outer circumferential surface 61, that is, causing the chamfered portion 65 and the chamfered portion 63 to communicate with each other, is provided in the contact surface 62 of the seal member 6. Accordingly, in the bearing structure 2, an air passage 72 (the second air passage) extending in the radial direction is provided between the seal member 6 and the outer circumferential portion of the oil-impregnated bearing 4. As illustrated in FIG. 4, plural (four in the embodiment) V-shaped grooves 75, that is, air passages 72, are arranged around the center line (axis).

As illustrated in FIG. 2, a V-shaped groove 76 extending from the inner circumferential surface 41 of the oil-impregnated bearing 4 to the outer circumferential surface 43, that is, causing the chamfered portion 46 and the chamfered portion 45 to communicate with each other, is provided on the bottom end surface 44 (the other end surface) of the oil-impregnated bearing 4. Accordingly, in the bearing structure 2, an air passage 73 extending in the radial direction is provided between the oil-impregnated bearing 4 and the base 11 (strictly, the washer 23) of the case 9. The recessed space 77 in which the thrust bearing 21 is disposed in the base 11 of the case 9 communicates with the space outside the seal member 6 via the air passage 73, the air passage 71 (the first air passage), the air passage 24, the air passage 72 (the second air passage), the space 25 inside the seal member 6, and the seal clearance 20. In FIG. 2, the number of V-shaped grooves 74 and the number of V-shaped grooves 76 are only one, but the number of V-shaped grooves 74 and the number of V-shaped grooves 76, that is, the number of air passages 71 (the first air passages) and the number of air passages 73 may be two or more.

When a lubricant leaking (exuding) from the oil-impregnated bearing 4 (illustratively shown by arrow A in FIG. 3) is delivered to the surface of the side surface portion 34 of the oil thrower groove 35 (the annular groove) of the shaft 3, a centrifugal force corresponding to the rotation speed of the shaft 3 acts on the lubricant on the side surface portion 34 in operating the air blower 1. By action of the centrifugal force, the lubricant on the side surface portion 34 moves downward obliquely along the bevel of the side surface portion 34. Accordingly, the lubricant on the side surface portion 34 is returned to the oil-impregnated bearing 4. The lubricant returned to the oil-impregnated bearing 4 is absorbed from the top end surface 42 (one end surface) of the oil-impregnated bearing 4 or the chamfered portion 48 provided along the edge between the inner circumferential surface 41 and the top end surface 42 by the oil-impregnated bearing 4 due to a capillary phenomenon of the porous sintered metal material (the first sintered metal material).

On the other hand, even when the lubricant leaking from the oil-impregnated bearing 4 is delivered to the annular portion 27 over the side surface portion 34 of the oil thrower groove 35 of the shaft 3, the centrifugal force corresponding to the rotation speed of the shaft 3 acts on the lubricant on the annular portion 27 and thus the lubricant on the annular portion 27 of the oil thrower groove 35 is removed, that is, separated from the shaft 3, by action of the centrifugal force and scattered to the large-diameter inner circumferential surface 64 of the seal member 6. The lubricant scattered from the annular portion 27 of the oil thrower groove 35 (illustratively shown by arrow B in FIG. 3) is received by the large-diameter inner circumferential surface 64 of the seal member 6 and is absorbed by the seal member 6 due to a capillary phenomenon of the porous sintered metal material (the second sintered metal material).

Since the density of the second sintered metal material of the seal member 6 is set to be lower than the density of the first sintered metal material of the oil-impregnated bearing 4, a capillary force (absorptive force) generated by the oil-impregnated bearing 4 is larger than the capillary force generated by the seal member 6. Accordingly, a force (absorptive force) obtained by subtracting the capillary force generated by the seal member 6 from the capillary force generated by the oil-impregnated bearing 4 acts on the lubricant in the vicinity of the interface between the oil-impregnated bearing 4 and the seal member 6, and thus the lubricant moves from the seal member 6 to the oil-impregnated bearing 4 (illustratively shown by arrow C in FIG. 3) and is absorbed from the outer circumferential portion of the top end surface 42 of the oil-impregnated bearing 4 by the oil-impregnated bearing 4. The lubricant scattered out from the annular portion 27 of the oil thrower groove 35 (illustratively shown by arrow B in FIG. 3), lubricant not received in the large-diameter inner circumferential surface 64 of the seal member 6 is absorbed from the inner circumferential portion of the top end surface 42 of the oil-impregnated bearing 4 by the oil-impregnated bearing 4.

For example, in a case in which the air blower 1 is installed with the axis set to the horizontal direction, even when the lubricant leaking from the oil-impregnated bearing 4 is delivered to the outer circumferential surface 38 of the second shaft portion 33 and moves to the outside of the seal member 6, the lubricant is attracted to the seal clearance 20 (illustratively shown by arrow D in FIG. 3). The lubricant attracted to seal clearance 20 is absorbed from the small-diameter inner circumferential surface 67 by the seal member 6 due to the capillary force generated by the seal member 6. The lubricant absorbed by the seal member 6 moves from the seal member 6 to the oil-impregnated bearing 4 due to the difference in capillary force (illustratively shown by arrow C in FIG. 3) and is returned to the oil-impregnated bearing 4. By applying a sealing process on at least a part of the outer circumferential surface 61 of the seal member 6 or the top end surface 68 (end surface opposite to the contact surface 62), it is possible to prevent the lubricant absorbed by the seal member 6 from leaking to the outside of the bearing holder 5. At least a part of the outer circumferential surface 61 of the seal member 6 or the top end surface 68 (end surface opposite to the contact surface 62) may be sealed.

According to the above-described embodiment, the seal member 6 is provided at the opening 51 of the bearing holder 5 and the contact surface 62 of the seal member 6 is brought into contact with the top end surface 42 (one end surface) of the oil-impregnated bearing 4. The density of the second sintered metal material of the seal member 6 is set to be lower than the density of the first sintered metal material of the oil-impregnated bearing 4. By employing this configuration, the capillary force (lubricant absorbing force) generated by the oil-impregnated bearing 4 is larger than the capillary force generated by the seal member 6, and the force corresponding to the difference in capillary force therebetween acts on the lubricant in the vicinity of the interface between the oil-impregnated bearing 4 and the seal member 6. Accordingly, the lubricant moves from the seal member 6 to the oil-impregnated bearing 4, and a lubricant flow from the seal member 6 to the oil-impregnated bearing 4 is provided in the bearing structure 2. That is, the lubricant absorbed by the seal member 6 can be smoothly returned to the oil-impregnated bearing 4.

In the embodiment, since the large-diameter inner circumferential surface 64 facing the oil thrower groove 35 of the shaft 3 is provided in the seal member 6, the lubricant leaking from the oil-impregnated bearing 4 is removed from the annular portion 27 of the oil thrower groove 35 of the shaft 3 due to the centrifugal force acting on the lubricant with the rotation of the shaft 3, scattered in the radial direction of the shaft 3, is received (collected) by the large-diameter inner circumferential surface 64 of the seal member 6, and is absorbed by the seal member 6. The lubricant absorbed in the seal member 6 is returned to the oil-impregnated bearing 4 as described above. In the embodiment, since the seal clearance 20 is provided between the outer circumferential surface 38 of the second shaft portion 33 and the small-diameter inner circumferential surface 67 of the seal member 6, the lubricant delivered into the outer circumferential surface 38 of the second shaft portion 33 is attracted to the seal clearance 20. The lubricant attracted into the seal clearance 20 is absorbed from the small-diameter inner circumferential surface 67 of the seal member 6 by the seal member 6. The lubricant absorbed in the seal member 6 is returned to the oil-impregnated bearing 4 as described above.

In the embodiment, the lubricant leaking form the oil-impregnated bearing 4 and delivered to the side surface portion 34 of the oil thrower groove 35 of the shaft 3 is returned to the oil-impregnated bearing 4 due to the centrifugal force acting on the lubricant with the rotation of the shaft 3.

In this way, the bearing structure 2 can efficiently return the lubricant leaking from the oil-impregnated bearing 4 to the oil-impregnated bearing 4 through routes such as the route in which the lubricant is absorbed from the top end surface 42 (one end surface) of the oil-impregnated bearing 4 and is returned directly to the oil-impregnated bearing 4, the route in which the lubricant is absorbed from the large-diameter inner circumferential surface 64 of the seal member 6 and is returned to the oil-impregnated bearing 4 via the contact surface 62, and the route in which the lubricant is attracted into the seal clearance 20, is absorbed from the small-diameter inner circumferential surface 67 of the seal member 6, and is returned to the oil-impregnated bearing 4 via the contact surface 62.

Accordingly, it is possible to more satisfactorily suppress leakage of a lubricant to the outside of the bearing holder 5, to hold the lubricant in the bearing holder 5 for a long period of time, and to achieve an extension of life of the air blower by employing this bearing structure 2.

Since the leakage of the lubricant to the outside of the bearing holder 5 is more satisfactorily suppressed, a lubricant with low viscosity and high fluidity at a low temperature can be used. Accordingly, the bearing structure can be applied to an air blower 1 which is installed in a storeroom of a low-temperature storage (for example, −40 degrees Celsius).

In the embodiment, since the seal member 6 made of a single material is added to the bearing structure 2, it is possible to suppress an increase in the number of components (members).

In the embodiment, since the seal member 6 is disposed in the same bearing holder 5 as the oil-impregnated bearing 4, it is possible to guarantee concentricity of the seal member 6 and to set the seal clearance 20 provided between the shaft 2 and the seal member 6 to be small.

In the embodiment, the recessed space 77 in which the thrust bearing 21 is received in the base 11 of the case 9, that is, the space 77 provided on the bottom of the bearing holder 5, communicates with the space outside the seal member 6 via the air passage 73, the air passage 71 (the first air passage), the air passage 24, the air passage 72 (the second air passage), the space 25, and the labyrinth clearance 20. Accordingly, a ventilation air passage in assembling the bearing structure 2 can be provided.

The present invention is not limited to the above-mentioned embodiment, and can be modified, for example, as follows.

At least a part of the outer circumferential surface 61 of the seal member 6 or the top end surface 68 (end surface opposite to the contact surface 62) may be applied with a sealing process (i.e. these portions may be sealed). When the sealing process is applied, it is possible to prevent the lubricant absorbed by the seal member 6 from leaking to the outside of the bearing holder 5.

Figure 5A:
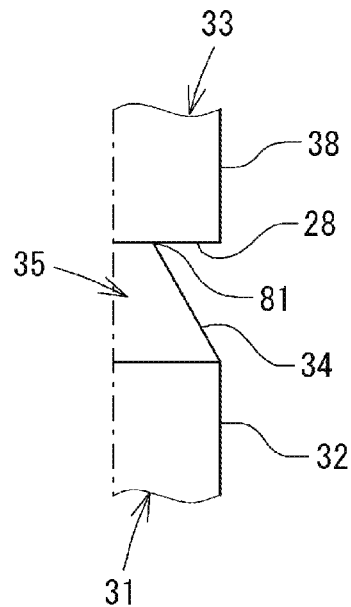
FIGS. 5A to 5C are diagrams illustrating other examples of an oil thrower groove.

In the oil thrower groove 35 (see FIG. 3) in the embodiment, the annular portion 27 having a constant outer diameter is provided between the side surface portion 34 and the annular surface 28, but the oil thrower groove 35 may have an arbitrary shape as long as it includes the side surface portion 34 of which the outer diameter decreases as it is separated away upward from the top end surface 42 (one end surface) of the oil-impregnated bearing 4. For example, as illustrated in FIG. 5A, the oil thrower groove 35 may be provided without forming the annular portion 27, that is, by forming a sharp angle 81 between the side surface portion 34 and the annular surface 28.

Figure 5B:
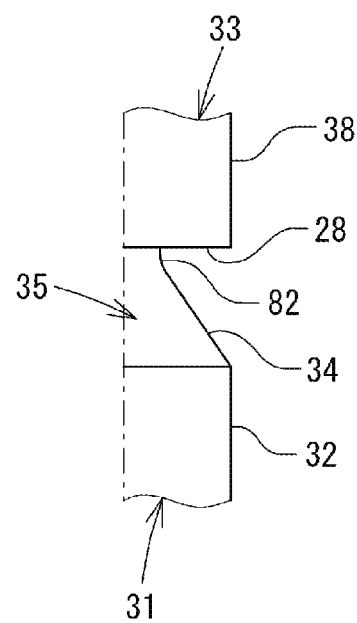

Alternatively, as illustrated in FIG. 5B, the oil thrower groove 35 may be provided by forming an annular curved portion 82 between the side surface portion 34 and the annular surface 28.

Figure 5C:
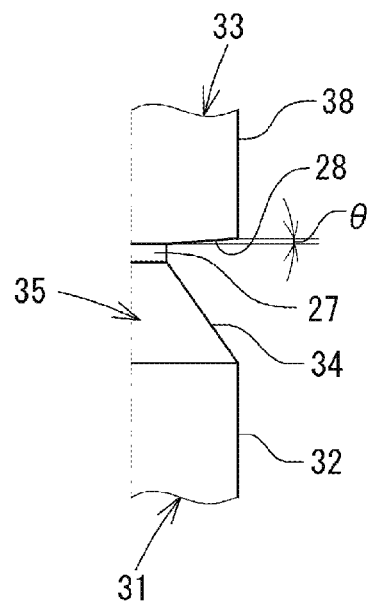

As illustrated in FIG. 5C, the oil thrower groove 35 may be provided by inclining the annular surface 28 upward by a predetermined angle θ with respect to the plane perpendicular to the shaft 3.

Figure 6A:
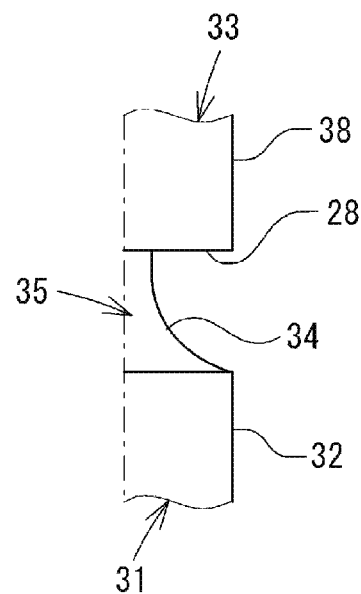
FIGS. 6A to 6C are diagrams illustrating other examples of an oil thrower groove.

The oil thrower groove 35 (see FIG. 3) in the embodiment, a sectional shape (hereinafter, referred to as a "sectional shape of the side surface portion 34") of the surface of the side surface portion 34 taken along the axial plane of the shaft 3 is provided in a straight line shape, but as illustrated in FIG. 6A, the sectional shape of the side surface portion 34 may be provided in a curved line concave inward to form the oil thrower groove 35.

Figure 6B:
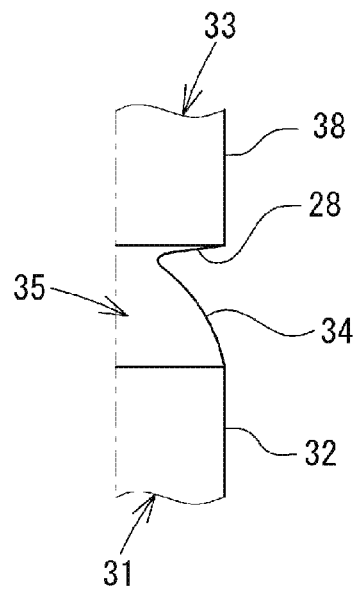

Alternatively, as illustrated in FIG. 6B, the sectional shape of the side surface portion 34 may be provided in a curved line convex outward and the annular surface 28 may be inclined upward with respect to the plane perpendicular to the shaft 3 to form the oil thrower groove 35.

Figure 6C:
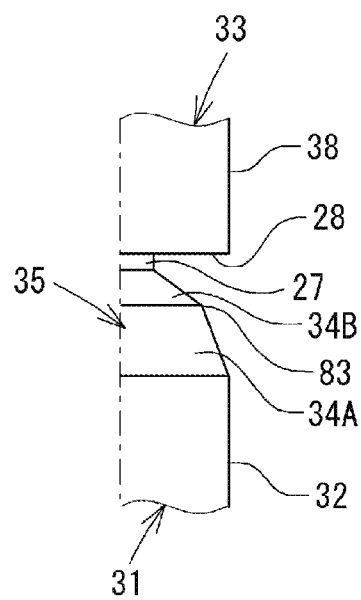

As illustrated in FIG. 6C, the side surface portion 34 may be provided to include a first side surface portion 34A which is connected to the first shaft portion 31 and of which the outer diameter decreases to a constant degree as it is separated upward away from the first shaft portion 31 and a second side surface portion 34B which is connected to the first side surface portion 34A and of which the outer diameter decreases by a degree larger than that of the first side surface portion 34A as it is separated upward away from the first side surface portion 34A to form the oil thrower groove 35. In this case, a circular edge portion 83 is provided between the first side surface portion 34A and the second side surface portion 34B.

As described with reference to the embodiments, according to the present invention, it is possible to provide a bearing structure capable of holding a lubricant for a long period of time. It is also possible to achieve an extension of life of an air blower.

What is claimed is:

1. A bearing structure comprising:
  a shaft;
  an oil-impregnated bearing that rotatably supports the shaft and includes a first sintered metal material having a first density, the oil-impregnated bearing having an outer circumferential surface, a first end surface, and a second end surface;
  a bearing holder that supports the outer circumferential surface of the oil-impregnated bearing and has an opening at a side closer to the first end surface of the oil-impregnated bearing than the second end surface of the oil-impregnated bearing; and
  a seal member that is provided at the opening of the bearing holder,
  wherein the shaft is provided with an annular groove having a side surface portion that is tapered to have a smaller outer diameter as a distance in an axial direction of the shaft from the first end surface of the oil-impregnated bearing becomes larger,
  wherein the seal member includes a second sintered metal material having a second density that is lower than the first density of the first sintered metal material, and
  wherein the seal member includes a contact surface that contacts with the first end surface of the oil-impregnated bearing, a first inner circumferential surface arranged to face the annular groove of the shaft, and a second inner circumferential surface that provides a seal clearance along the outer circumferential surface of the shaft, a diameter of the second inner circumferential surface being smaller than a diameter of the first inner circumferential surface.

2. The bearing structure according to claim 1,
  wherein the contact surface of the seal member is configured to be in contact with an outer circumferential portion of the first end surface of the oil-impregnated bearing.

3. The bearing structure according to claim 1 further comprising:
  a first air passage that is provided between the oil-impregnated bearing and the bearing holder and extends from the first end surface to the second end surface of the oil-impregnated bearing; and
  a second air passage that is provided between the first end surface of the oil-impregnated bearing and the contact surface of the seal member, the second air passage connecting the first air passage with an inner space of the seal member.

4. The bearing structure according to claim 1,
  wherein the second sintered metal material of the seal member is a porous sintered metal material, and
  wherein at least a part of an outer circumferential surface of the seal member or an end surface opposite to the contact surface is subjected to a sealing process to seal pores contained in the porous sintered metal material.

5. An air blower comprising:
  a rotor;
  a stator;
  a case that accommodates the rotor and the stator; and
  a bearing structure that is provided between the rotor and the stator, the bearing structure comprising:
  a shaft;
  an oil-impregnated bearing that rotatably supports the shaft and includes a first sintered metal material having a first density, the oil-impregnated bearing having an outer circumferential surface, a first end surface, and a second end surface;
  a bearing holder that supports the outer circumferential surface of the oil-impregnated bearing and has an opening at a side closer to the first end surface of the oil-impregnated bearing than the second end surface of the oil-impregnated bearing; and
  a seal member that is provided at the opening of the bearing holder,
  wherein the shaft is provided with an annular groove having a side surface portion that is tapered to have a smaller outer diameter as a distance in an axial direction of the shaft from the first end surface of the oil-impregnated bearing becomes larger,
  wherein the seal member includes a second sintered metal material having a second density that is lower than the first density of the first sintered metal material, and wherein the seal member includes a contact surface that contacts with the first end surface of the oil-impregnated bearing, a first inner circumferential surface arranged to face the annular groove of the shaft, and a second inner circumferential surface that provides a seal clearance along the outer circumferential surface of the shaft, a diameter of the second inner circumferential surface being smaller than a diameter of the first inner circumferential surface.

* * * * *